United States Patent [19]

Heiberger

[11] 4,387,632

[45] Jun. 14, 1983

[54] CONTROL SYSTEM FOR SYNCHRONIZING POWER PRESSES AND ASSOCIATED FEED MECHANISM WITH INTERLOCK FEATURES

[75] Inventor: Francis E. Heiberger, Elmhurst, Ill.

[73] Assignee: Danly Machine Corporation, Chicago, Ill.

[21] Appl. No.: 284,940

[22] Filed: Jul. 20, 1981

[51] Int. Cl.³ .............................................. B30B 15/30
[52] U.S. Cl. ........................................ 100/45; 100/53
[58] Field of Search ................... 100/45, 53, 215, 43; 72/8; 83/63, 366, 399, 400, 74, 76

[56] References Cited

FOREIGN PATENT DOCUMENTS

| 2013272 | 10/1971 | Fed. Rep. of Germany | 100/53 |
| 2757170 | 6/1979 | Fed. Rep. of Germany | 100/45 |
| 2757253 | 7/1979 | Fed. Rep. of Germany | 100/53 |
| 56-47299 | 4/1981 | Japan | 100/53 |

Primary Examiner—Billy J. Wilhite
Attorney, Agent, or Firm—Leydig, Voit, Osann, Mayer & Holt, Ltd.

[57] ABSTRACT

A control system for a press having a synchronized feed mechanism includes a first drive motor for the press, a second drive motor for the feed mechanism, means responsive to the positions of the press and the feed mechanism for producing an output signal representing any change in the positional relationship between the press and the feed mechanism, control means responsive to the output signal for controlling the speed of the drive motor for the feed mechanism, and means for adjusting the control means to simulate a change in the press position and thereby effect a movement of the feed mechanism. An interlock is responsive to adjustments of the control means for enabling the startup of the press only when the control means is in a preselected position representing a desired positional relationship between the press and the feed mechanism.

7 Claims, 1 Drawing Figure

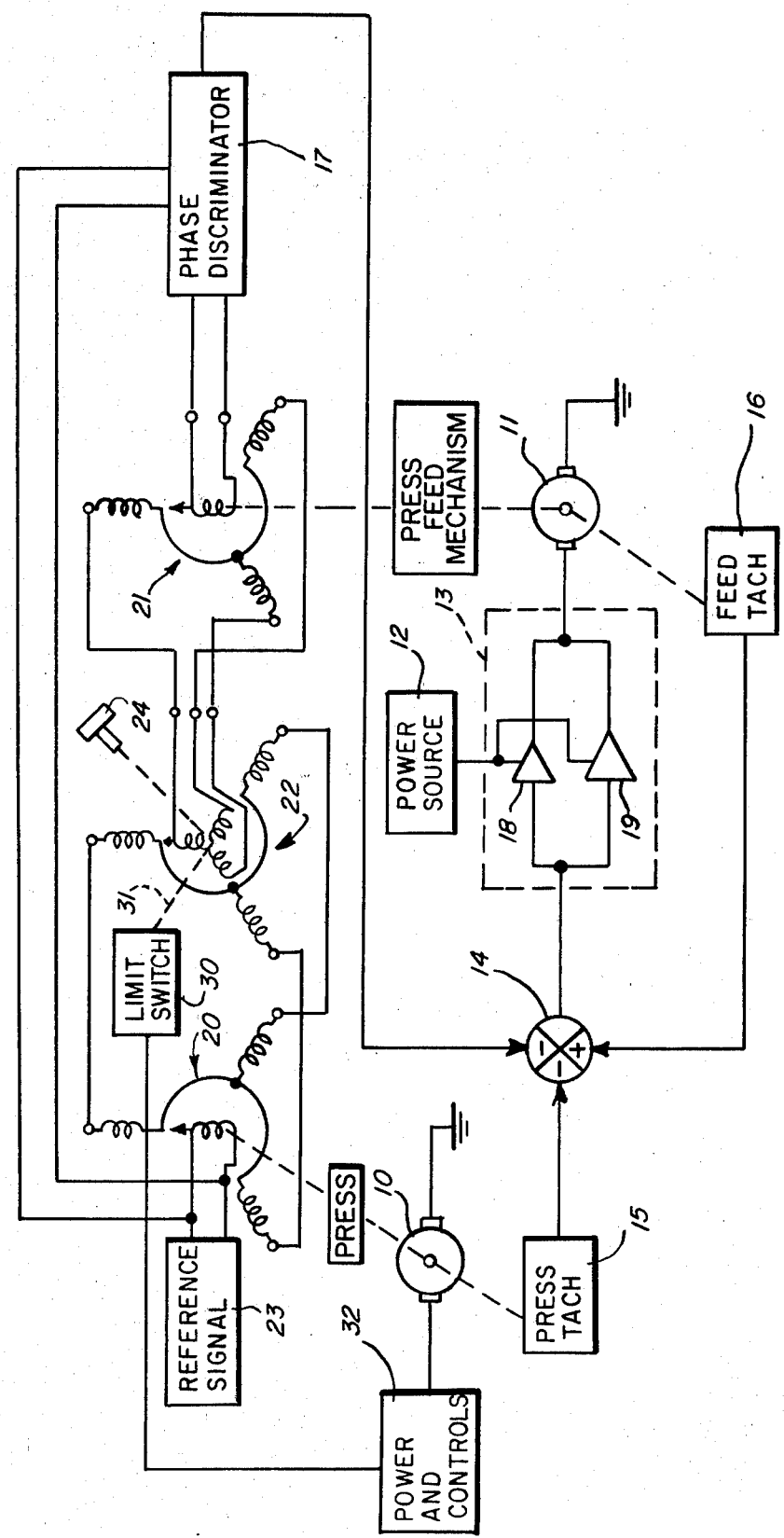

CONTROL SYSTEM FOR SYNCHRONIZING POWER PRESSES AND ASSOCIATED FEED MECHANISM WITH INTERLOCK FEATURES

DESCRIPTION OF THE INVENTION

The present invention relates to power presses and, more particularly, to control systems for automatically synchronizing such presses with the workpiece feed mechanisms associated therewith. This invention is particularly applicable to transfer feed presses.

It is a primary object of the present invention to provide an improved press control system which ensures synchronization of the feed mechanism with the press mechanism, at startup as well as during normal running, without the need for mechanical coupling between the press drive and the various heavy cams which control the feed mechanism.

It is another object of this invention to provide such an improved press control system which permits the feed mechanism to be driven independently of the press mechanism for set-up purposes, while still ensuring synchronization of the press and feed mechanisms at startup.

A further object of the present invention is to provide such an improved press control system which facilitates resynchronization of the press and the feed mechanism following jamming or other malfunctioning of the press.

Other objects and advantages of the invention will be apparent from the following detailed description and the accompanying drawings.

In accordance with the present invention, there is provided a control system which comprises a first drive motor for the press and a second drive motor for the feed mechanism; means responsive to the positions of the press and the feed mechanism for producing an output signal representing any change in the positional relationship between the press and the feed mechanism; control means responsive to the output signal of the position responsive means for controlling the speed of the drive motor for the feed mechanism; means for adjusting the position responsive means to simulate a change in the press position and thereby effect a movement of the feed mechanism; and interlock means responsive to adjustments of the position responsive means for enabling the startup of the press only when the position responsive means is in a preselected position representing a desired positional relationship between the press and the feed mechanism.

In the drawings, the single FIGURE is a schematic diagram of a control system for synchronizing the operation of the press mechanism and the feed mechanism in the press of FIG. 1.

While the invention has been illustrated and will be described in some detail with reference to a particular embodiment, there is no intention to limit the invention to this particular embodiment. On the contrary, it is intended to cover all modifications, alternatives and equivalents falling within the spirit and scope of the invention as defined by the appended claims.

Turning now to the drawings, a d-c. drive motor 10 drives the press slide, and a second d-c. drive motor 11 drives the feed mechanism, e.g., in a transfer feed press. The motor 11 is supplied with power from a source 12 via a d-c. regulator 13 which controls the velocity at which the transfer feed mechanism is driven by regulating the level of current supplied to the armature of the motor 11. More specifically, the regulator 13 controls the current supplied to the motor 11 according to a signal from a summing junction 14 which receives input signals from a press tachometer 15, a feed tachometer 16, and a phase discriminator 17.

The signals from the two tachometers 15 and 16 represent the actual velocities of the press drive shaft and the cam shaft of the feed mechanism, respectively, and are applied to inverting and non-inverting inputs, respectively, of the summing junction 14. The press velocity signal from the tachometer 15 serves as a reference signal for controlling the actual velocity of the feed mechanism as represented by the signal from the tachometer 16. These "reference velocity" and "actual velocity" signals are algebraically summed at the junction 14 to produce a "velocity error" signal proportional to any difference between the actual velocities of the feed drive and the press drive. Consequently, the press mechanism and the feed mechanism are driven in speed synchronism with each other.

From the summing junction 14, the "velocity error" signal is supplied to one of a pair of power amplifiers 18 and 19 included in the regulator 13. Only one of these two amplifiers 18 and 19 is active at any given time, depending upon whether the press is operating in the forward or reverse mode. Whenever the velocity of the feed drive drops below the reference level set by the press velocity signal from the tachometer 15, the magnitude of the velocity error signal increases, and the current supplied to the armature of the feed drive motor 11 is increased accordingly. Conversely, whenever the velocity of the feed drive is above the reference level set by the press velocity signal from the tachometer 15, the magnitude of the velocity error signal decreases so that the current supplied to the armature of the feed drive motor 11 is decreased accordingly.

To ensure that the press mechanism and the feed mechanism are in position synchronism with each other, as well as velocity synchronism, a pair of inductive synchros are connected to the outputs of the press drive motor 10 and the feed drive motor 11, respectively. These synchros are used to supply the summing junction 14 with a "position error" signal which "trims" the velocity error signal produced by the algebraic summing of the two velocity signals from the tachometers 15 and 16, in order to maintain the desired positional relationship between the press and feed mechanisms. Thus, a press position synchro 20 is connected to the output of the press drive motor 10; a feed position synchro 21 is connected to the output of the feed drive motor 11; and these two synchros 20 and 21 are coupled to a differential synchro 22. As long as the press and feed mechanisms remain in the desired positional synchronization with each other, the output of the differential synchro 22 remains constant.

As is well known in the art, a synchro is a transformer whose primary-to-secondary coupling may be varied by physically changing the relative orientation of the two windings. This is accomplished by mounting one of the windings so that it is free to rotate inside the other. The inner, movable winding is called the rotor, and the outer, stationary winding is called the stator. In the arrangement illustrated in FIG. 2, the rotor winding of the press position synchro 20 is energized with an a-c. signal from a reference source 23 (which may be a conventional a-c. line), and the rotor is mechanically coupled to the output of the press drive motor 10 so that the phase angle of the a-c. signal induced in the stator winding varies in direct proportion to the angular displacement of the output shaft of the motor 10. This a-c. signal from the stator winding of the synchro 20 is supplied to the stator of the differential synchro 22, which has its rotor mechanically connected to a manual adjustment knob 24. Thus, the phase angle of the a-c. signal induced in the rotor winding of the differential synchro 22 is proportional to the difference between the positions of the rotors of the press position synchro 20 and the manually adjustable differential synchro 22. These rotor positions are, in turn, representative of the position of the press slide minus any offset introduced by manual adjustment of the rotor of the differential synchro 22.

For the purpose of comparing the position of the feed mechanism with the position of the press, the electrical signal induced in the rotor winding of the differential synchro 22 is supplied to the stator winding of the feed position synchro 21. The rotor is this latter synchro 21 is connected to the output shaft of the feed drive motor 11. Consequently, the phase angle of the a-c. signal induced in the rotor winding of the feed position synchro 21 is proportional to the difference between the angular positions of the press and feed mechanisms. As long as these two mechanisms retain the same positional relationship to each other, the a-c. output signal from the rotor winding of the feed position synchro 21 will have a constant phase relationship to the reference signal supplied to the rotor winding of the press position synchro 20. On the other hand, if the positional relationship between the press and feed mechanisms changes, the phase relationship between the signals in the rotor windings of the two synchros 20 and 21 also changes.

To produce a d-c. "position error" signal whose magnitude varies in proportion to changes in the phase relationship between the reference signal supplied to the synchro 20 and the a-c. output signal from the synchro 21, these two signals are fed to the phase discriminator 17. This discriminator 17 produces a d-c. output which is supplied to the summing junction 14 as the "trim" signal mentioned previously. In the event that the position of the feed mechanism begins to lead or lag the position of the press mechanism, the level of the d-c. output from the phase discriminator 17 rises or falls accordingly, thereby adjusting the "trim" input to the summing junction to effect the necessary correction in the speed of the feed drive motor 11 and thereby restore positional synchronization between the press and feed mechanisms.

The feed mechanism can be moved independently of the press during setup by turning the manual adjustment knob 24 connected to the rotor of the differential synchro 22. Turning this rotor with the adjustment knob 24 simulates a change in the press position, thereby producing an output signal from the phase discriminator 17 which causes the drive motor 11 to move the feed mechanism. Thus, by turning the rotor of the differential synchro 22 in this manner at a slow speed, the transfer feed mechanism will follow. This is a helpful feature during setup of the feed mechanism.

In accordance with an important feature of the present invention, an interlock device responds to adjustments of the differential synchro to enable startup of the press only when the differential synchro is in a preselected position representing a desired positional relationship between the press and the feed mechanism. Thus, as shown in FIG. 2, an automatic cycle limit switch 30 controlled by an actuator 31 on the rotor of the differential synchro 22 disables the startup of the press whenever the differential synchro rotor is in any position representing an undesired positional relationship between the press and the feed mechanism. Consequently, the press can be started only when the feed mechanism is in the desired position relative to the startup position of the press.

For the purpose of enabling and disabling startup of the press, the automatic cycle limit switch 30 is connected to the starting and running controls 32 for the press drive motor 10. When the switch 30 is open, the press run or inch circuit 10 cannot be energized, thereby preventing the cycling of the press until the rotor of the differential synchro 22 is returned to the desired "home" position which represents the requisite positional relationship between the press and the feed mechanism for startup. When the rotor of the differential synchro is moved to the "home" position, the actuator 31 closes the switch 30 so that the press run or inch circuit can be energized.

As can be seen from the foregoing detailed description, the control system of this invention ensures synchronization of the feed mechanism with the press mechanism, at startup as well as during normal running, without the need to mechanically align the press drive with the various heavy cams which control the feed mechanism. Moreover, this system permits the feed mechanism to be driven independently of the press mechanism for setup purposes, and it facilitates re-synchronization of the press and the feed mechanism following jamming or other malfunctioning of the press.

I claim as my invention:

1. A control system for a press having a synchronized feed mechanism, said control system comprising
   a first drive motor for the press and a second drive motor for the feed mechanism,
   means responsive to the positions of the press and the feed mechanism for producing an output signal representing any change in the positional relationship between the press and the feed mechanism,
   control means responsive to said output signal for controlling the speed of the drive motor for the feed mechanism,
   means for adjusting said position responsive means to simulate a change in the press position and thereby effect a movement of the feed mechanism, and
   interlock means responsive to adjustments of said position responsive means for enabling the startup of the press when said position responsive means is in a preselected position representing a desired positional relationship between the press and the feed mechanism, and for disabling the startup of the press when said position responsive means is in any position representing an undesired positional relationship between the press and the feed mechanism, so that the press can be started only when the feed mechanism is in the desired position relative to the startup position of the press.

2. A control system as set forth in claim 1 wherein said position responsive means comprises position indicating means for generating first and second signals which continuously represent the positions of the press and the feed mechanism, respectively, and a differential synchro responsive to said first and second signals.

3. A control system as set forth in claim 2 wherein said position indicating means comprises a pair of synchros, one of which is connected to the press drive and the other of which is connected to the feed mechanism drive.

4. A control system as set forth in claim 2 wherein said adjusting means comprises manually controllable means for adjusting the rotor of said differential synchro.

5. A control system as set forth in claim 4 wherein said interlock means comprises switching means for enabling and disabling the cycling of said press by said first drive motor, and means for actuating said switching means in response to movement of the rotor of said differential synchro.

6. A control system as set forth in claim 1 which includes means for generating velocity signals representing the output speeds of said first and second drive motors, and said control means is responsive to said velocity signals as well as said output signal from said position responsive means.

7. A control system as set forth in claim 1 wherein said press is a transfer feed press.

* * * * *